United States Patent [19]

Gölzer

[11] 4,387,835
[45] Jun. 14, 1983

[54] BICYCLE PANNIER

[76] Inventor: Siegbert Gölzer, Am Mühlberg 30, D-6780 Pirmasens, Fed. Rep. of Germany

[21] Appl. No.: 250,382

[22] Filed: Apr. 2, 1981

[30] Foreign Application Priority Data

Apr. 9, 1980 [DE] Fed. Rep. of Germany ....... 3013593

[51] Int. Cl.³ .......................... B62J 9/00; B65D 25/30
[52] U.S. Cl. .................................. 224/32 A; 220/94 A
[58] Field of Search ........................... 224/32 R, 32 A; 220/94 A

[56] References Cited

U.S. PATENT DOCUMENTS

| 1,963,333 | 6/1934 | Morales | 224/32 A |
| 3,786,972 | 1/1974 | Alley | 224/32 A X |
| 3,831,805 | 8/1974 | Yonce | 220/94 A |
| 4,278,172 | 7/1981 | Ghebresillassie | 220/94 A X |

FOREIGN PATENT DOCUMENTS

| 1201751 | 9/1965 | Fed. Rep. of Germany ... | 220/94 A |
| 2263143 | 10/1975 | France | 224/32 A |
| 476706 | 12/1937 | United Kingdom | 224/32 R |

Primary Examiner—Allan N. Shoap
Attorney, Agent, or Firm—Kontler, Grimes & Battersby

[57] ABSTRACT

A bicycle pannier is securably fastened to the luggage rack of a bicycle. The pannier includes a container open at the top end thereof and a lid hinged to the container and adapted to sealably enclose the top end of the container. The lid and the container each include complimentary oblique passages permitting a locking ring to be inserted therethrough for locking the pannier to the bicycle. The complimentary passages also serve as a handle for manually transporting the pannier.

10 Claims, 4 Drawing Figures

BICYCLE PANNIER

BACKGROUND OF THE INVENTION

The invention concerns a bicycle pannier, and, more particularly, to such a bicycle pannier adapted to be fastened to a luggage rack with a lockable lid.

The object of the invention is to make a theft-proof bicycle pannier.

In accordance with the invention, provision is made that the lid, for locking, has an eye of such a kind that it, or another eye protruding through it, can be locked simultaneously with a wheel of the bicycle by a locking ring.

Thus the pannier is not only locked, but also cannot be removed from the bicycle.

Preferably the remaining part of the pannier also has an eye which can be locked by a locking ring or by another eye which can be locked by a locking ring.

This improves the security against theft considerably. It also allows the pannier to be fastened very simply, e.g. to be hung on the luggage rack, so that it can also be easily removed and taken with one for shopping or the like. Absent the last eye it is necessary to have a safe fastening of the remaining part of the pannier to the bicycle in order to exclude the possibility that the interior of the pannier, through loosening of the fastening and removal of the remaining part of the pannier; remains accessible from the lid.

The eye on the remaining part of the pannier can be the above-mentioned further eye which locks the eye of the lid, or the other way round, but it can also be, in principle, an eye like that of the lid, which, together with the eye of the lid, is locked by a locking ring.

OBJECTS AND SUMMARY OF THE INVENTION

In accordance with an advantageous embodiment of the invention the eye of the lid and/or the eye of the remaining part of the pannier are formed as integral parts of the lid or remaining parts of the pannier.

This solution facilitates handling and is pleasing in shape.

As a rule, the eye of the lid and, if there is one, the eye of the remaining part of the pannier will be fitted on the upper, inner edge of the pannier.

Preferably thereby the lid can be swung up about a pivot axis located deep on the outside of the pannier, so that its swing-path, when it is opened up only goes a short way upwards and luggage extending from the luggage carrier to the pannier needs only to be lifted a little and the opening of the pannier is then largely to the side.

The lid can be so designed that when it is closed it forms a continuation of the luggage carrier and when it is opened it stands off approximately horizontally and thus facilitates unloading.

As an advantageous development of the invention, it is further suggested that the lid externally overlap, the remaining part of the pannier.

The overlap holds the pannier closed, even with the play which is unavoidable and even with a tightly fitting locking ring. Additionally it renders it waterproof.

Finally, a particularly advantageous development of the invention consists in that the eye or eyes are so dimensionally that they can be gripped by hand as a carrying handle. The pannier can then all the more easily and more comfortably be carried even when full and heavily packed. For example, it can be taken to one's room. The fitting mentioned of the eyes on the upper, inner edge thereby permits the two panniers to be grasped by hand.

The usual locking rings for bicycles are of a size suitable for use with two panniers in accordance with the invention. One can also, however, draw a chain through and lock it with a padlock, which would adapt exactly to all size relationships, even in the case of a single pannier.

A firm, rigid, rain proof and secured design in the manner of a suitcase constitutes the preferred embodiment of the subject invention.

DETAILED DESCRIPTION OF THE PREFERRED EMBODIMENTS

Figure 1:
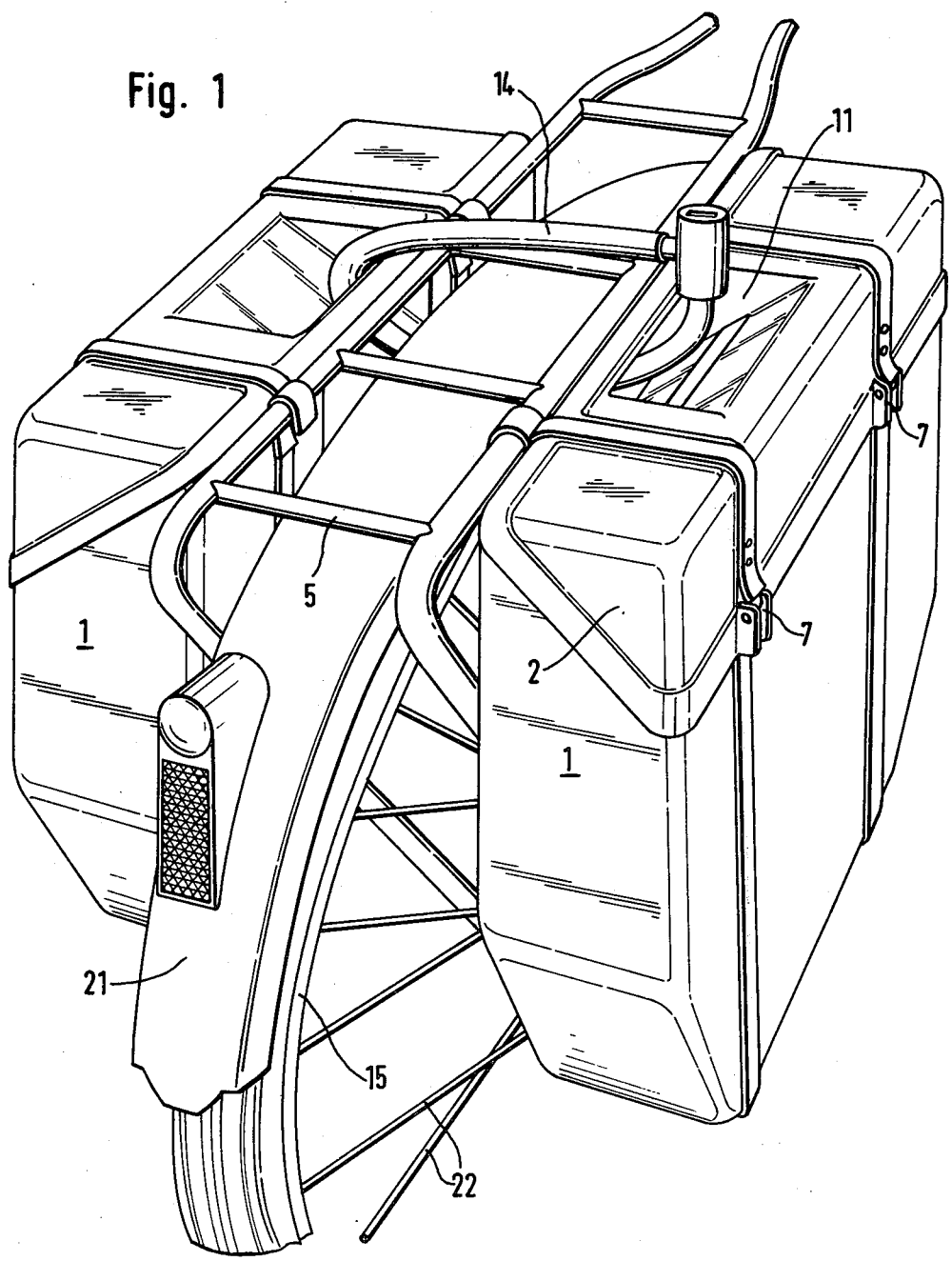
FIG. 1 shows the back wheel of a bicycle with luggage rack and two panniers shown in perspective.

The two bicycle panniers 1 consist of a container 3 closable by a flap lid 2 which hangs by two hooks 4 on a luggage rack 5 of a bicycle and further is clamped fast below by a clamping device 6 on the supports of the luggage rack or on the frame of the bicycle.

Both parts of the bicycle pannier, the container and its lid are e.g. moulded from polypropylene.

The lid 2 forms the cover and an upper section of the outer side wall, as well as the corresponding triangular section of the front and back side walls of the pannier. It is hinged on the outer side wall of the container by hinges 7 and overlaps the container all the way round on the outside. This overlap appears in the section shown above at 8 and below at 9.

In the container 3 as well as in its lid 2 a passage 10 or 11 is formed in such a way that the container or lid wall at such passage is angled inwardly. The inward angle of the container is obliquely upwards, that of the lid is directed obliquely downwards; their ends interlock, whereby here, too, the lid, with regard to the interior of the pannier, forms the outer part of the overlap. This overlap 12 lies in the same oblique plane as the above mentioned overlap 8, 9.

Figure 3:
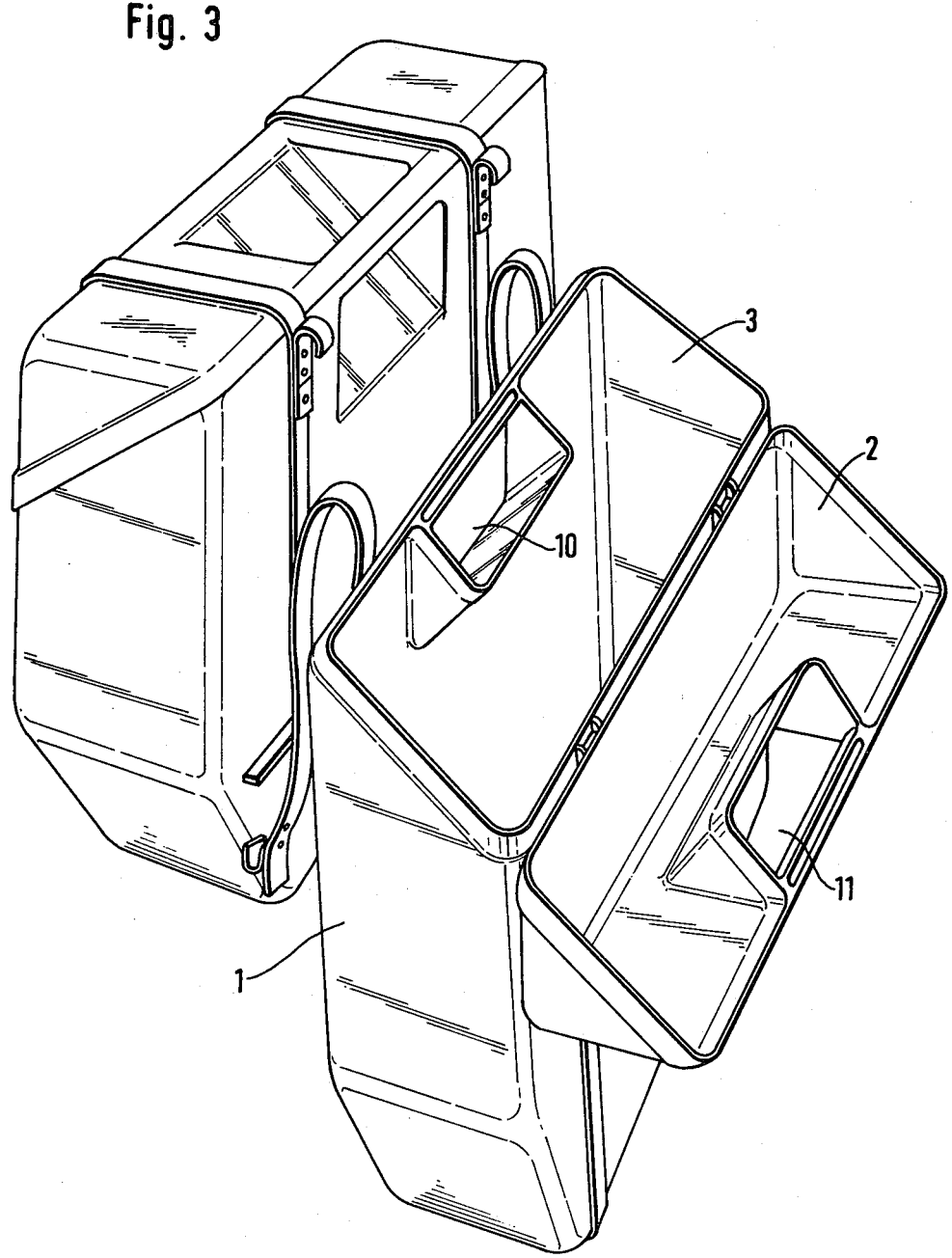
FIG. 3 shows the two panniers removed from the bicycle, one opened up.
Figure 4:
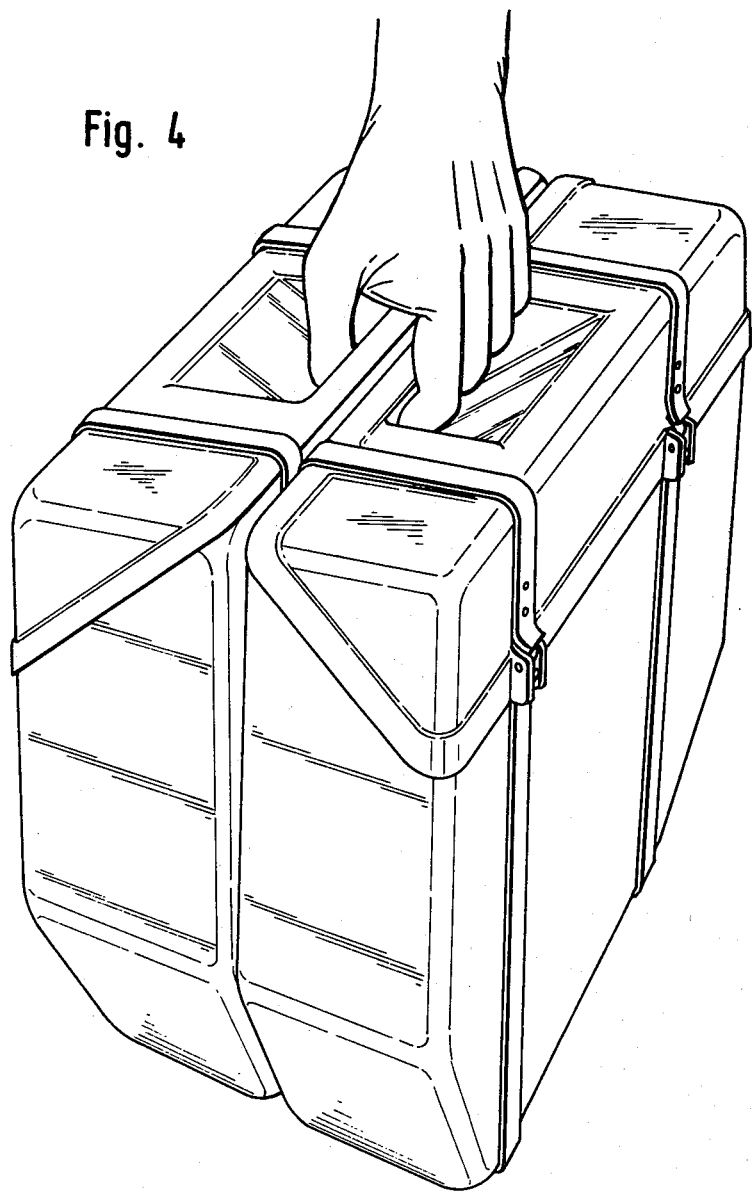
FIG. 4 shows the two panniers being carried.

The cross-section of the oblique passage 10,11 has, as can best be seen from FIG. 3, a longitudinally rectangular cross-section of such a size that it can be grasped with the hand, as is shown in FIG. 4. Thereby the walls of the container 3 and of its lid 2 form a hand-grip 13 along the edge of the pannier of an approximately oval cross-section which is suitable for this.

Figure 2:
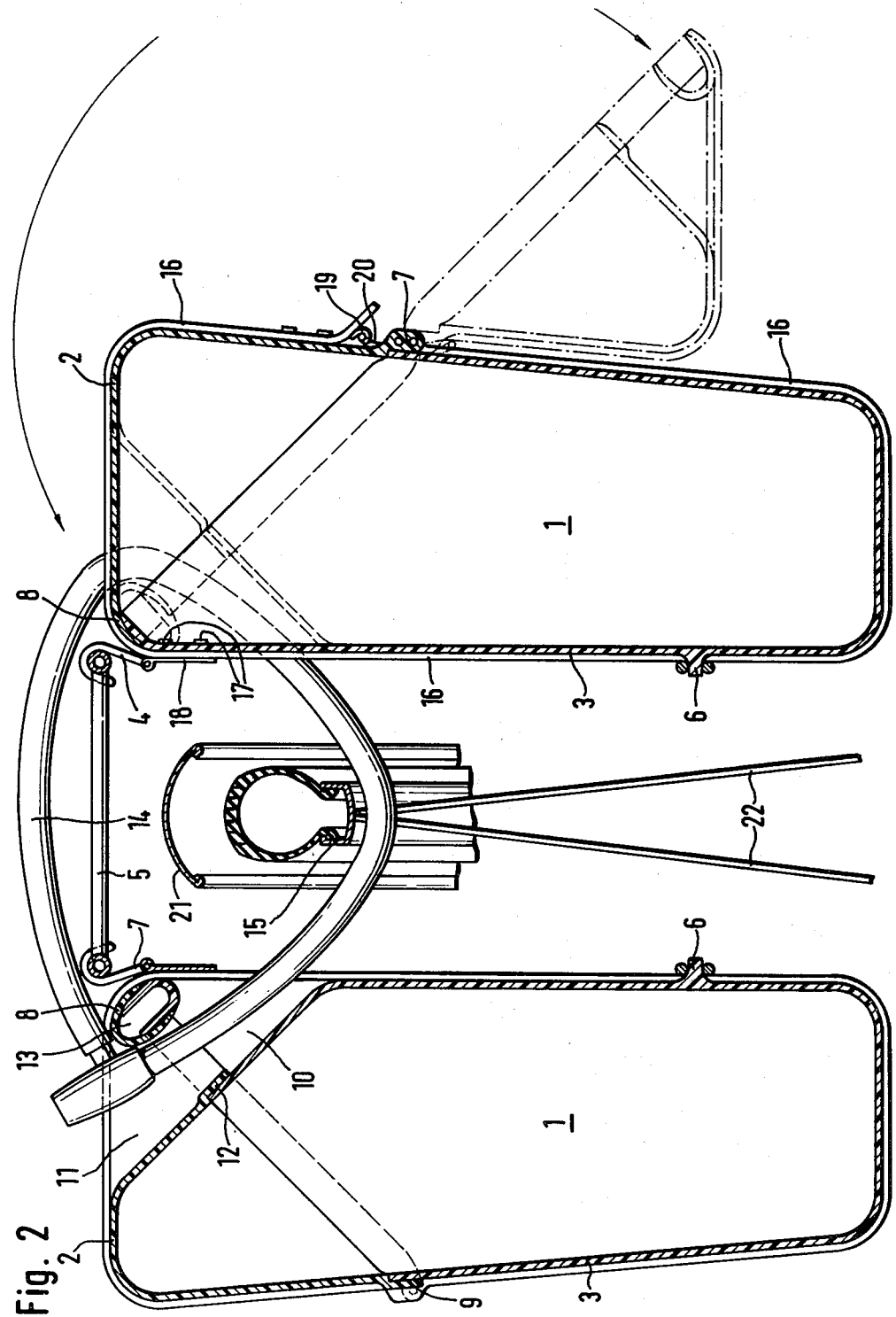
FIG. 2 shows a perpendicular cross-section through the parts shown in FIG. 1.

In order to close the bicycle panniers 1 and to lock them on to the bicycle and simultaneously to lock up the bicycle, an extra bicycle lock 14, as shown in FIGS. 1 and 2, is passed under the rim 15 of the back wheel and through the passage 10, 11 of the two panniers 1 and laid over the luggage rack 5 and locked.

For the rest, the lid 2 is in each case held closed by two elasticated straps 16 which go round the pannier on the outside and are rivetted to the wall of the container 3 at 17 together with butt straps 18 on which the hooks 4 are hinged and, after they have been laid loose over the lid 2, they are fastened with hooks 19 rivetted to their ends by rings 20 to the hinges 7.

The lid 2 when it is closed lies in the carrying plane of the luggage rack and, when it is open, as is shown by the dotted line in FIG. 2, can serve as a deposit for surplus.

For the sake of completeness, a mudguard 21 and spokes 22 of a bicycle wheel are illustrated.

I claim:

1. A bicycle pannier adapted to be securably fastened to the luggage rack of a bicycle, said pannier having a container open at the top end thereof and a lid hinged to said container and adapted to sealably enclose the top end thereof, wherein said container and said lid each include complimentary oblique passages adapted to permit a locking ring to be inserted therethrough for locking said lid in a closed position to said container, for locking said pannier to a wheel of said bicycle and for locking the wheel itself, said container having a front wall and a rear wall opposed thereto adapted to be positioned adjacent the bicycle, said rear wall extending higher than said front wall with the top end of the connecting side walls sloping downwardly from said rear wall to said front wall, said lid having a substantially horizontal top wall, a substantially vertical forward wall adapted to be substantially aligned with said front wall, and sides interconnecting the top and forward walls, said lid being attached to said container at the bottom of said forward wall to said front wall, the bottom edge of said sides sloping downwardly from said top wall to said forward wall when said lid closes said top end of the container to correspondingly mate with said sloping walls of said container, the oblique passage of said container extending at a slope upwardly from said rear wall and the oblique passage of said lid extending at a slope downwardly from said top wall to correspondingly mate with said oblique passage of said container.

2. The bicycle pannier of claim 1, wherein the complimentary oblique passages are further adapted to serve as a handle for transporting said pannier.

3. The bicycle pannier of claim 1, wherein the complimentary oblique passages of the container and the lid are formed as integral parts of said container and said lid, respectively.

4. The bicycle pannier of claim 1, wherein the complimentary oblique passages are positioned on the upper edge of the pannier adjacent the bicycle.

5. The bicycle pannier of claim 1, wherein the lid is adapted to be opened by swinging upwardly about an axis located deep on the rear wall of the pannier.

6. The bicycle pannier of claim 1, wherein the top of the lid, when in a closed position, is level with the top of the luggage rack of the bicycle.

7. The bicycle pannier of claim 1, wherein the lid of the pannier, when opened, assumes a substantially horizontal position.

8. The bicycle pannier of claim 1, wherein the lid, when closed, is adapted to overlap the container to render the inside of the pannier substantially waterproof.

9. The bicycle pannier of claim 1 wherein the lid of said pannier is held closed by at least one strap surrounding the pannier.

10. The bicycle pannier of claim 1 wherein the strap is elasticized and is riveted to the wall of the container.

* * * * *